(12) United States Patent
Baskin et al.

(10) Patent No.: US 10,604,246 B2
(45) Date of Patent: Mar. 31, 2020

(54) ROTORCRAFT ROTOR ASSEMBLIES

(71) Applicant: Sikorsky Aircraft Corporation, Stratford, CT (US)

(72) Inventors: Bryan K. Baskin, Arlington, TX (US); Robert Higbie, Haslet, TX (US); Frank P. D'Anna, Seymour, CT (US); Ryan Smith, Fort Worth, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 471 days.

(21) Appl. No.: 15/406,316

(22) Filed: Jan. 13, 2017

(65) Prior Publication Data
US 2019/0009897 A1    Jan. 10, 2019

Related U.S. Application Data

(60) Provisional application No. 62/281,427, filed on Jan. 21, 2016.

(51) Int. Cl.
*B64C 27/48* (2006.01)
*B64C 27/10* (2006.01)

(52) U.S. Cl.
CPC .............. *B64C 27/48* (2013.01); *B64C 27/10* (2013.01)

(58) Field of Classification Search
CPC .......... F01D 1/26; F01D 5/3053; F03D 1/064; F03D 1/0658; F03D 1/0675; F03D 1/0683; B64C 27/10; B64C 27/46; B64C 27/463; B64C 27/48; B64C 27/473; B64C 27/33; B64C 27/50; B64C 27/32; F05B 2220/90; F16B 5/02; F16B 5/0258

USPC .................................. 416/2, 210 R; 411/383
See application file for complete search history.

(56) References Cited

U.S. PATENT DOCUMENTS

| | | | | |
|---|---|---|---|---|
| 3,785,670 A | * | 1/1974 | Smith | B62B 5/00 280/79.11 |
| 4,239,455 A | * | 12/1980 | Broekhuizen | B64C 27/001 416/145 |
| 4,435,100 A | * | 3/1984 | Cox | F16B 31/00 16/378 |
| 4,540,340 A | * | 9/1985 | Pariani | B64C 27/008 416/134 A |
| 4,889,458 A | * | 12/1989 | Taylor | F16B 21/10 411/383 |
| 7,530,787 B2 | | 5/2009 | Bertolotti et al. | |
| 8,221,020 B2 | * | 7/2012 | Svensson | F16B 2/14 403/156 |
| 8,500,407 B1 | * | 8/2013 | Kennedy | B64C 27/48 416/209 |
| 9,051,047 B2 | * | 6/2015 | Parsons | B64C 27/473 |
| 9,714,579 B2 | * | 7/2017 | Kuntze-Fechner | B64C 27/33 |
| 2012/0087797 A1 | * | 4/2012 | Kuntze-Fechner | B64C 27/33 416/220 A |
| 2015/0147177 A1 | | 5/2015 | Alfano | |

\* cited by examiner

*Primary Examiner* — Brian P Wolcott
(74) *Attorney, Agent, or Firm* — Cantor Colburn LLP

(57) ABSTRACT

An attachment assembly for coupling a rotary blade to a hub includes a hollow shear pin, a nut cap, and a tensioning fastener. The hollow shear pin defines an attachment axis. The nut cap abuts the shear pin along the attachment axis. The tensioning fastener is seated within the shear pin, is threadably engaged to the nut cap, and has an axial length that is smaller than an axial length of the shear pin to fix a rotary blade to a rotor assembly within a profile of the rotary blade.

15 Claims, 4 Drawing Sheets

ROTORCRAFT ROTOR ASSEMBLIES

CROSS-REFERENCE TO RELATED APPLICATION

This application claims the benefit of priority under 35 U.S.C. § 119(e) to U.S. Provisional Application No. 62/281,427, filed Jan. 21, 2016, which is incorporated herein by reference in its entirety.

STATEMENT REGARDING FEDERALLY SPONSORED RESEARCH OR DEVELOPMENT

This invention was made with government support under Contract No. HR0011-14-C-0010 awarded by the Defense Advanced Research Projects Agency. The government has certain rights in the invention.

BACKGROUND OF THE INVENTION

1. Field of the Invention

The present disclosure relates to fastener assemblies, and more particularly to fastener assemblies for coupling rotary blades to rotor assemblies in rotorcraft.

2. Description of Related Art

Rotorcraft commonly include rotor systems to provide lift, anti-torque, and/or propulsion to the rotorcraft. The rotor system generally includes one or more rotor blades that protrude laterally from the rotor system and rotate in concert with one another about a rotation axis. As the rotor blades rotate about the rotation axis the rotation exerts centrifugal force on the rotor blade, which the rotor system must resist for the rotor system to retain its mechanical integrity. The centrifugal force corresponds to the mass of the rotor blade and the rotational speed of the rotor system, and typically transfers from the rotor blade a rotor hub through a nut and bolt arrangement. In some rotor systems, portions of the nut and bolt arrangement can protrude beyond the surface of the rotor blade, thereby providing access to the nut and bolt arrangement for inspection and/or maintenance. While generally satisfactory for their intended purpose, protruding hardware can generate drag, potentially reducing the aerodynamic efficiency of the rotor assembly. In some flight regimes, such as high-speed flight, protruding portions of nut and bolt arrangements can influence the performance of rotorcraft mounting such rotor systems.

Such conventional methods and systems have generally been considered satisfactory for their intended purpose. However, there is still a need in the art for improved attachment assemblies for rotary blades, rotor assemblies, and rotorcraft employing such rotor assemblies. The present disclosure provides a solution for this need.

SUMMARY OF THE INVENTION

An attachment assembly for coupling a rotary blade to a hub includes a hollow shear pin, a nut cap, and a tensioning fastener. The hollow shear pin defines an attachment axis. The nut cap abuts an end of the shear pin along the attachment axis. The tensioning fastener is seated within the shear pin, threadably engages to the nut cap, and has an axial length that is smaller than an axial length of the shear pin to fix a rotary blade to a rotor assembly within a profile of the rotary blade.

In certain embodiments the shear pin can have a seat disposed within an interior of the shear pin for seating the tensioning fastener entirely with the hollow interior of the shear pin. The shear pin can have opposed first and second ends, and the tensioning fastener can be offset from both the first and second ends of the shear pin. The first end of the shear pin can have a compression flange, and the compression flange can extend about the first end of the shear pin. The compression flange can extend radially outward from a first end of the shear pin, such as at a 90-degree angle. A rim portion can extend about the first end shear pin. The rim portion can be oriented at an oblique angle relative to the attachment axis defined by the shear pin.

In accordance with certain embodiments, the nut cap can have an annular portion. The annular portion can have within its interior a female threaded segment. The annular portion can have within its interior an anti-rotation feature. The anti-rotation feature can be axially stacked with the female threaded segment along the attachment axis. The nut cap can have a compression flange disposed on an end of the annular portion opposite the female threaded segment. The compression flange can extend radially outward from the nut cap, such as at a 90-degree angle. The nut cap can have a rim portion disposed on the end of the annular portion opposite the female threaded segment, and the rim portion can be oriented at an oblique angle relative to the attachment axis.

It is contemplated that, in accordance with certain embodiments, the tensioning fastener can be asymmetrically disposed between the first and second ends of the shear pin. The tensioning fastener can be below flush relative to both the first end and the second end of the shear pin. A prong spacer can be circumferentially about the shear pin. The shear pin can have a necked segment, and the prong spacer can extend about the necked segment. A bushing can be disposed about the first end of the shear pin to seat within the attachment aperture or a prong aperture. A bushing can be disposed about the second end of the shear pin to seat within the attachment aperture or a prong aperture.

A rotary blade includes a blade body defining an attachment aperture with a recessed seat extending about the attachment aperture. An attachment assembly as described above seats within the attachment aperture such that the nut cap abuts the recessed seat within an aerodynamic profile of the blade body. The shear pin, nut cap, and tensioning fastener can be housed completely within the aerodynamic profile of the blade body. A plug can be seated in the attachment aperture, and a surface of the plug opposite the attachment assembly can be conformal with the aerodynamic profile of the blade body. The compression flange of the nut cap can abut a second recessed seat defined on a side blade body opposite the first recessed seat. A rotorcraft can have a rotor assembly including a rotary blade and attachment assembly as described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
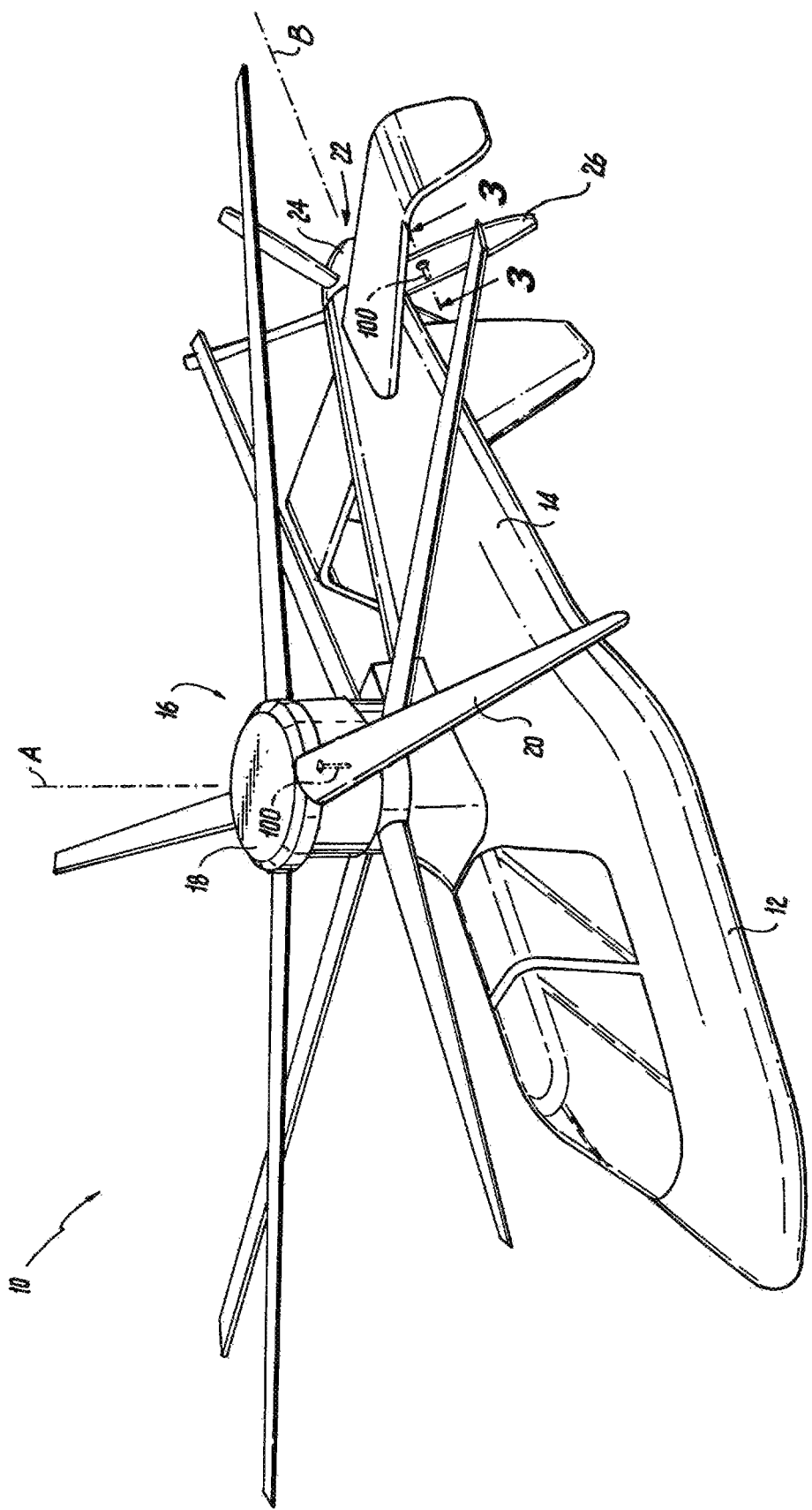
FIG. 1 is a schematic perspective view of an exemplary embodiment of a rotorcraft constructed in accordance with the present disclosure, showing a fastener assembly coupling a rotary blade to a rotor assembly of a rotorcraft.

Reference will now be made to the drawings wherein like reference numerals identify similar structural features or aspects of the subject disclosure. For purposes of explanation and illustration, and not limitation, a partial view of an exemplary embodiment of an attachment assembly in accordance with the disclosure is shown in FIG. 1 and is designated generally by reference character 100. Other embodiments of attachment assemblies, rotary blade assemblies, rotor assemblies, and rotorcraft having such attachment assemblies in accordance with the disclosure, or aspects thereof, are provided in FIGS. 2-4, as will be described. The systems and methods described herein can be used in rotorcraft, such as compound rotorcraft having coaxial, counter-rotating rotor assemblies. However, the invention is not limited to a particular type of rotorcraft or to rotorcraft in general, and can be used in other types of aircraft including fixed wing aircraft and tilt-wing aircraft. It is also contemplated that systems and methods described herein can be used in devices other than aircraft, such as in marine, wind turbine, industrial machinery applications.

Referring to FIG. 1, an exemplary embodiment of a rotorcraft 10 is shown. Rotorcraft 10 is a high-speed vertical takeoff and landing (VTOL) rotary-wing aircraft having an airframe 12 and a longitudinally extending tail 14. Airframe 12 supports a counter-rotating coaxial main rotor system 16 that is rotatable about a main rotor system rotation axis A. Main rotor system 16 includes a hub 18 with a rotary blade 20 coupled to hub 18. Longitudinally extending tail 14 supports a tail rotor system 22, e.g., a propulsor, that is rotatable about a tail rotor system axis B. Tail rotor system 22 includes a hub 24 with a rotary blade 26 coupled to hub 24. Either or both of main rotor system rotary blade 20 and/or tail rotor system rotary blade 26 may be connected to the hub 18 or hub 24 by attachment assembly 100, as will be described below. Although a particular aircraft configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotor, tilt-wing aircraft and non-aircraft applications will also benefit from present disclosure.

Figure 2:
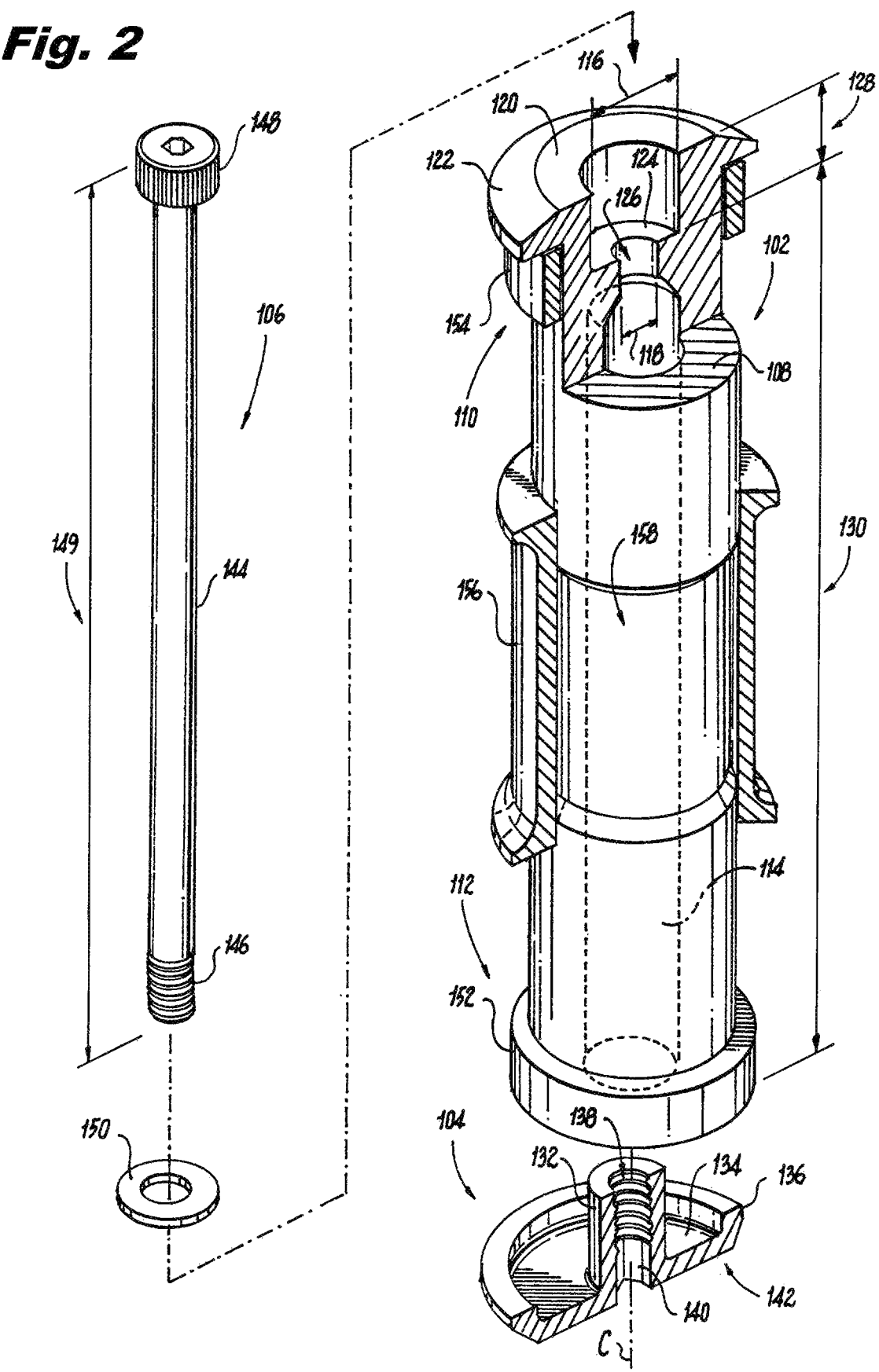
FIG. 2 is an exploded partial cross-sectional view of the attachment assembly of FIG. 1, showing the components of the attachment assembly.

With reference to FIG. 2, attachment assembly 100 is shown. Attachment assembly 100 includes a shear pin 102, a nut cap 104, and a tensioning fastener 106. Shear pin 102 has an annular body 108 with a first end 110 and a second end 112. First end 110 is disposed on an end of annular body 108 that is opposite second end 112 relative to an attachment axis C defined by shear pin 102. An aperture 114 formed within a hollow interior of shear pin 102 extends along attachment axis C between first end 110 and second end 112. An interior surface of annular body 108 bounds aperture 114 and defines therein a first width 116 and a second width 118 along attachment axis C. First width 116 is greater than second width 118.

First end 110 of shear pin has a compression flange 120. Compression flange 120 of shear pin 102 extends radially about first end 110 and outward relative to attachment axis C with a cantilevered profile. The cantilevered profile is angled relative to attachment axis C, the angle being about 90-degrees or any other suitable angle when attachment assembly 100 is in an unloaded condition. In the illustrated exemplary embodiment compression flange 120 has rim portion 122. Rim portion 122 extends radially about first end 110 and outward relative to attachment axis C, and is oriented obliquely relative to attachment axis C.

Between first end 110 and second end 112 of shear pin 102, annular body 108 of shear pin 102 has fastener seat 124. Fastener seat 124 defines an internally disposed fastener aperture 126 with attachment axis C extending therethrough. Fastener aperture 126 is configured to receive tensioning fastener 106 and has a diameter corresponding to second width 118. Fastener seat 124 is disposed within the interior of shear pin 102 and axially offset along attachment axis C from both first end 110 and second end 112. In this respect fastener seat 124 is axially offset from first end 110 by a first offset distance 128 and is axially offset from second end 112 by a second offset distance 130. First offset distance 128 is smaller than second offset distance 130, enabling tensioning fastener 106 to be received within shear pin 102 below flush relative to both first end 110 and second end 112.

Nut cap 104 has an annular portion 132, a compression flange 134, and a rim portion 136. Annular portion 132 defines within its interior a female threaded segment 138 and an anti-rotation feature 140. Anti-rotation feature 140 is axially stacked with female threaded segment 138 such that, when seated on second 112 of shear pin 102, anti-rotation feature 140 is disposed axially outward of female threaded segment 138 relative to first end 110 of shear pin 102. This allows for nut cap 104 to be rotationally fixed along attachment axis C using a tool received therein. In the illustrated embodiment anti-rotation feature 140 is bounded by hexagonally arranged tool-receiving surfaces within the interior of nut cap 104.

Compression flange 134 of nut cap 104 extends radially about an end 142 of nut cap 104 opposite female threaded segment 138 and outward relative to attachment axis C with a cantilevered profile. The cantilevered profile is angled relative to attachment axis C, the angle being about 90-degrees or any other suitable angle when attachment assembly 100 is in an unloaded condition. In the illustrated exemplary embodiment rim portion 136 axially opposes (faces) rim portion 122 of shear pin 102 in the assembled configuration (shown in FIG. 1). Rim portion 136 extends radially about end 142 of nut cap 104 and outward relative to attachment axis C, and is oriented obliquely relative to attachment axis C.

Tensioning fastener 106 includes an axially extending body 144 with a male threaded segment 146 and opposed head 148. Axially extending body 144 is configured and adapted to be slideably received in fastener seat 124 and within fastener aperture 126 and male threaded segment 146 threadably received within female threaded segment 138 of nut cap 104, head 148 thereby being compressively seated against on fastener seat 124. A first outer bushing 152 extends about shear pin 102 adjacent to first end 110 and a second outer bushing 154 extends about shear pin 102 adjacent to second end 112 distribute force, enabling fastener assembly 100 to transfer load into a composite structure (shown in FIG. 3). A spacer 156 extends about shear pin 102 axially overlapping a necked segment 158 of shear pin 102, reducing the weight of shear pin 102. Optionally, a washer 150 may be seat axially between head 148 and fastener seat 124.

It is contemplated that axially extending body 144 of tensioning fastener has a length 149 that is shorter than an axial length 152 of shear pin 102, enabling attachment assembly 100 to be disposed wholly within shear pin 102, thereby enabling attachment assembly 100 to be wholly disposed within an aerodynamic profile of the rotary blade within which fastener assembly 100 is disposed. In the illustrated exemplary embodiment, tensioning fastener 106 is bolt or other suitable fastener.

Figure 3:
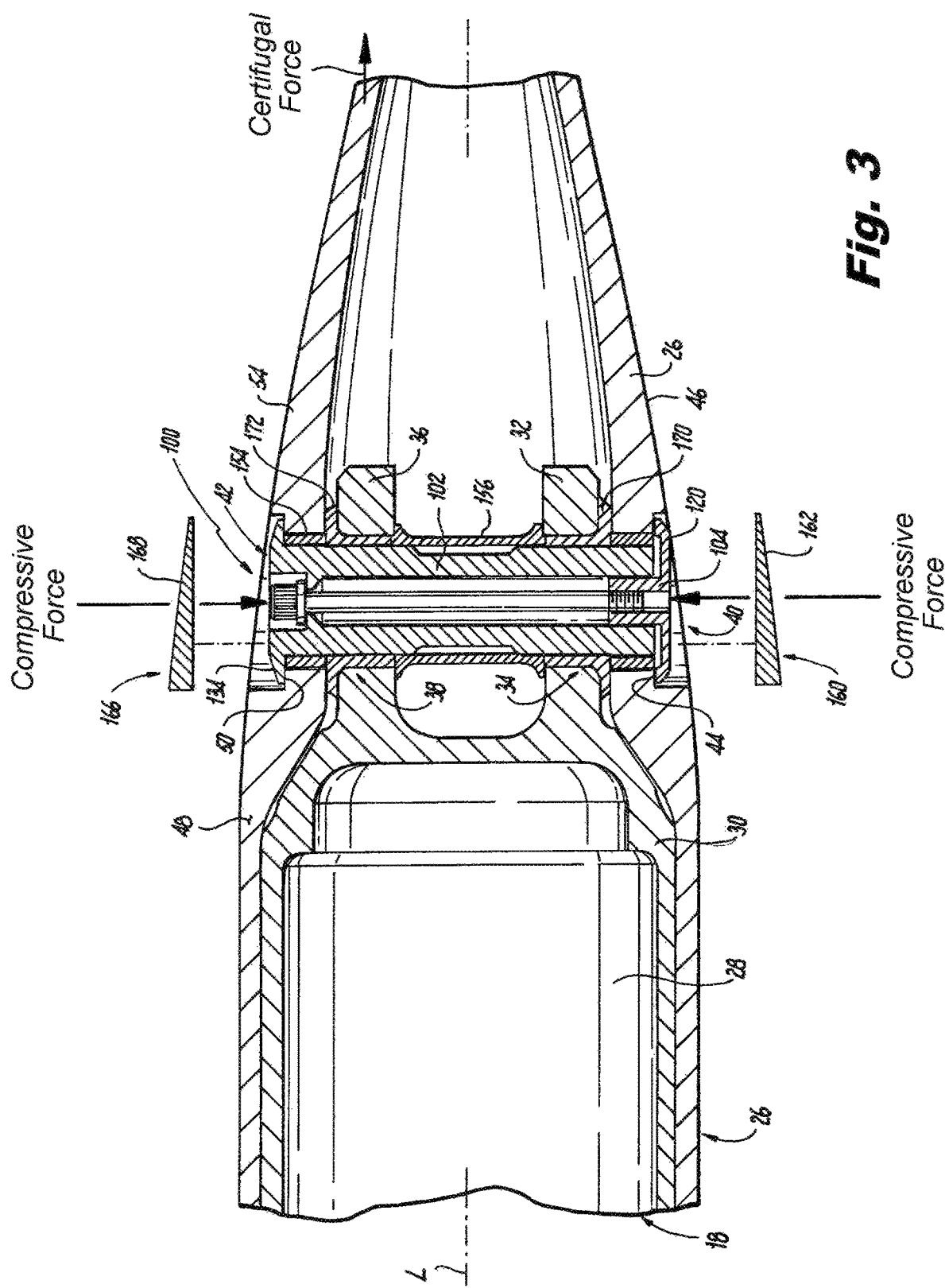
FIG. 3 is a cross-sectional spanwise view of the attachment assembly of FIG. 1, showing a rotary blade body coupled to a hub by the attachment assembly.

With reference to FIG. 3, attachment assembly 100 is shown in a spanwise cross-section coupling a rotary blade to a hub of a rotor assembly, e.g., rotary blade 20 to hub 18. Hub 18 has a rotor sleeve 28 with a clevis 30 on a radially outboard end of rotor sleeve 28 relative to rotor assembly rotation axis. Clevis 30 includes a first prong 32 defining a first prong aperture 34 and an opposed second prong 36 with a second prong aperture 38. Spacer 156 extends between first prong 32 and second prong 36 to resist compressive force from clamping pressure exerted on the first prong 32 and second prong 36, and may be in contact with shear pin 102 at opposite ends, thereby enabling first prong 32 and second prong 36 to be relatively lightweight construction. It is also contemplated that first prong 32 and second prong 36 can be incorporated into a solid clevis structure.

Rotary blade 20 defines a first attachment aperture 40 on one side and a second attachment aperture 42 on a second side opposite first attachment aperture 40. First attachment aperture 40 has within its interior a first recessed seat 44. First recessed seat 44 is axially recessed within the rotary blade and presents a substantially planar surface that is oblique relative to an aerodynamic profile 46 of rotary blade 20. Second attachment aperture 42 has a second recessed seat 50 similar to first recessed seat 44 with the difference that second recessed seat 50 mirrors first recessed seat 44 about a longitudinal axis L of rotary blade 20. A composite structure 48 of rotary blade 20 bounds first recessed seat 44 and second recessed second recessed seat 50, and in the illustrated exemplary embodiment has a greater thickness on an inboard side of the respective recessed seat than on an outboard side of the respective recessed seat.

First attachment aperture 40, first prong aperture 34, second prong aperture 38, and second attachment aperture 42 are registered with one another. Attachment assembly 100 is slideably received within the registered apertures such that compression flange 120 of shear pin 102 seats on first recessed seat 44 and compression flange 134 of nut cap 104 seats on second recessed seat 50, attachment axis C thereby extending through the apertures.

First outer bushing 152 seats about shear pin 102 and within first attachment aperture 40. Second outer bushing 154 seats about shear pin 102 and within second attachment aperture 42, first outer bushing 152 and second outer bushing 154 thereby distributing centrifugal force evenly into composite laminates forming composite structure 48 by increasing the bearing area and correspondingly reducing bearing pressure. A first inner bushing 170 seats about shear pin 102, within first prong aperture 34, and axially between first outer bushing 152 and spacer 156. A second inner bushing 172 seats about shear pin 102, within second prong aperture 38, and axially between spacer 156 and second outer bushing 154. As will be appreciated by those of skill in art in view of the present disclosure, bushing 154 and bushing 152 (shown in FIG. 2) may not be required in embodiments where rotary blade 26 is constructed from a metallic structure.

As will be appreciated by those of skill in the art in view of the present disclosure, threadably engaging male threaded segment 146 of tensioning fastener 106 with female threaded segment 138 of nut cap 104 loads tensioning fastener 106 with a tensile load. The tensile load of tensioning fastener 106 exerts compressive force on opposed ends of attachment assembly 100, and therethrough to first recessed seat 44 and second recessed seat 50. This places attachment assembly 100 in the force flow between centrifugal force exerted on rotary blade 20 during rotation and hub 18, the centrifugal being transferred from rotary blade 20 through attachment assembly 100 and into rotor sleeve 28 through structure wholly disposed within aerodynamic profile 46.

Figure 4:
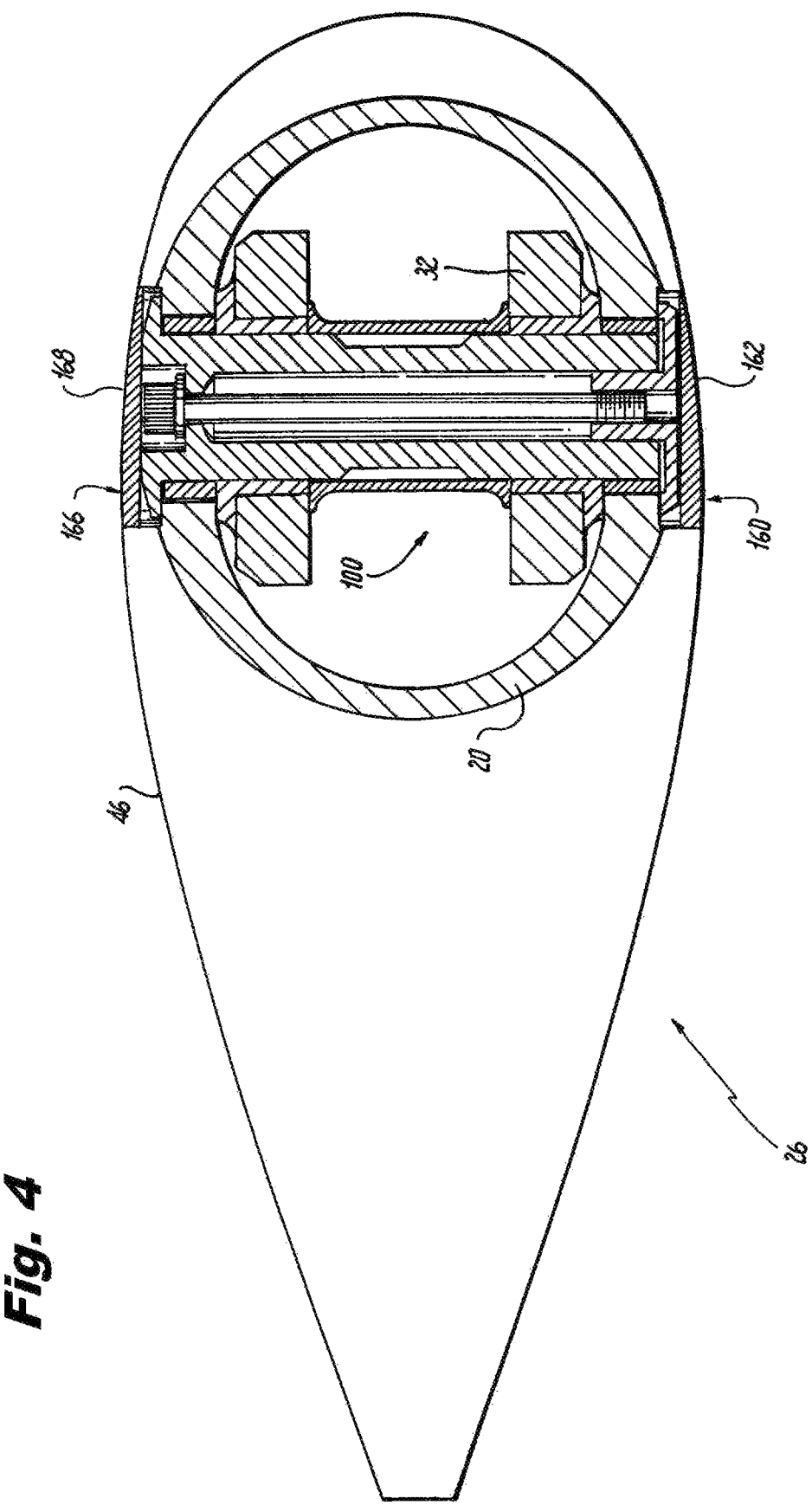
FIG. 4 is a cross-sectional cord wise view of the attachment assembly of FIG. 1, showing the rotary blade body coupled to the hub by the attachment assembly.

With reference to FIGS. 3 and 4, a first plug 160 seats within first attachment aperture 40 and axially adjacent to nut cap 104. First plug 160 has a surface 162 disposed on an axial side of attachment assembly 100 that is conformal with aerodynamic profile 46 of rotary blade 20, separating attachment assembly from airflow across aerodynamic profile 46 and there further reducing drag associated with attachment assembly 100. A second plug 166 seats within second attachment aperture 42 and axially adjacent to compression flange 134. Second plug 166 is similar to first plug 162 with the different that it includes a surface 168 that is conformal with aerodynamic profile on a side opposite first plug 160. It is contemplated that first plug 160 and second plug 166 can be formed form a resin or polymeric material, decreases in thickness between respective inboard and outboard ends, and fill the portion of the attachment aperture not occupied by attachment assembly 100. While not required in all aspects, it is contemplated that compression flange 120 and/or nut cap 104 can also present an axial surface conforming to aerodynamic profile 46.

Conventional rotorcraft like helicopters can generate relatively high centrifugal loads which must be reacted to retain rotary blades in a rotor assembly. Fasteners, typically nut and bolt-type arrangements, are typically used to retain the rotary blades in the rotor assembly, generally with relatively large nuts and bolts that protrude outside of the basic blade contour. While satisfactory for their intended purpose, such fastener arrangements can generate drag during rotor assembly rotation.

In embodiments described herein, rotary blade assemblies includes a structural load path extending through a low-profile attachment. The low-profile attachment can provide reduced or substantially no additional drag relative, and may conform to the aerodynamic contour of the rotary blade. In certain embodiments, the low-profile attachment includes one or more of a shear pin, a nut cap, and a tension fastener that are disposed within the basic contour of the rotary blade, thereby providing a low-profile attachment with reduced or substantially no drag attributable to the attachment. It is contemplated that shear pin can be a hollow shear pin configured to transfer centrifugal load from the rotary blade to the rotor assembly.

In contemplated embodiments, the nut cap can include an internal tool-receiving feature, such as an internal female hex receptacle, thereby allowing the nut cap to be anti-rotated during assembly. The nut cap can also define a female threaded segment for receiving a male threaded segment of the tension fastener that, in the illustrated exemplary embodiment, is below flush relative to the shear pin. The shear pin can be captured by the nut cap, and the tension fastener can apply a compressive force to the shear pin by engaging the nut cap.

In accordance with certain embodiments, the hollow shear pin can define within its interior a counter bore and a shoulder for seating thereon the tension fastener, thereby retaining the tension fastener to be retained below flush. The compressive force can include a preload for resisting force having a force component angled relative to the direction of centrifugal force applied to the rotary blade during rotation. It is also contemplated that, in accordance with certain embodiments, the shear pin can extending through a radially inner clevis in a lug/clevis arrangement, and one or more bushings may extend about the shear pin to assist in load transfer and reduce wear.

The rotary blade can receive the attachment, e.g., the nut cap and the shear pin, on one or more seating features (e.g., a transition area) that is configured to transfer load from the rotary blade, through the attachment, and into the clevis. In certain embodiments, the one or more seating features are defined within composite structure disposed with a blade body contour. The composite structure defining the seating feature may be thicker on an inboard end than an outboard end relative to an axis defined by the shear pin.

The methods and systems of the present disclosure, as described above and shown in the drawings, provide for rotary blade assemblies with attachments that provide superior properties including equivalent or better structural integrity and reduced aerodynamic drag. Rotorcraft employing such rotary blade assemblies can exhibit superior properties, including improved hover efficiency and/or efficiency during high-speed flight. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An attachment assembly for coupling elements of an aircraft rotor assembly, comprising:
    a hollow shear pin defining an attachment axis and having a first end and a second end, the hollow shear pin comprising a seat and a shear pin flange disposed at the second end along the attachment axis;
    a nut cap abutting the first end of the shear pin along the attachment axis, the nut cap having a nut cap flange; and
    a tensioning fastener seated within the shear pin abutting the seat of the second end and threadably engaged to the nut cap, wherein the tensioning fastener has an axial length that is smaller than an axial length of the shear pin, whereby the nut cap flange and shear pin flange fix the coupled elements.

2. The attachment assembly as recited in claim 1, wherein the seat is an internal annular seat disposed within an interior of the hollow shear pin.

3. The attachment assembly as recited in claim 2, wherein the internal annular seat is axially offset from both the first end and the second end of the shear pin.

4. The attachment assembly as recited in claim 1, wherein the shear pin flange is a compression flange extending radially outward from the second end of the shear pin.

5. The attachment assembly as recited in claim 1, wherein the shear pin has a rim disposed around the attachment axis and is oblique relative to the attachment axis defined by the shear pin.

6. The attachment assembly as recited in claim 1, wherein the nut cap has an annular portion, the annular portion defining therein a female threaded segment.

7. The attachment assembly as recited in claim 6, wherein the annular portion of the nut cap defines therein an anti-rotation feature, the anti-rotation feature being axially stacked relative to the female threaded segment.

8. The attachment assembly as recited in claim 6, wherein the nut cap has a compression flange disposed on an end of the nut cap opposite the female threaded segment.

9. The attachment assembly as recited in claim 6, wherein the nut cap has a rim portion disposed on an end of the nut cap opposite the female threaded segment and oblique relative to the attachment axis defined by the shear pin.

10. The attachment assembly as recited in claim 1, wherein the tensioning fastener is asymmetrically arranged between opposed first and second ends of the shear pin.

11. The attachment assembly as recited in claim 1, further including a prong spacer extending about the shear pin.

12. The attachment assembly as recited in claim 11, wherein the shear pin defines a necked segment axially adjacent to the prong spacer.

13. The attachment assembly as recited in claim 1, further including a bushing seated about the shear pin.

14. A rotary blade of an aircraft, comprising:
    a blade body defining an attachment aperture with a recessed seat extending about the attachment aperture; and
    an attachment assembly as recited in claim 1 seated in attachment aperture, wherein the nut cap or the shear pin flange abuts the recessed seat within an aerodynamic profile of the blade body to fix the rotary blade to a rotor assembly.

15. The rotary blade as recited in claim 14, further including a plug seated in the attachment aperture, wherein a surface of the plug opposite the attachment assembly is conformal with the aerodynamic profile of the blade body.

* * * * *